United States Patent [19]

Kalinichenko

[11] 4,215,393
[45] Jul. 29, 1980

[54] APPARATUS FOR NUMERICAL CONTROL OF THYRISTOR INVERTER

[76] Inventor: Anatoly Y. Kalinichenko, Orekhovo-Zuevsky proezd, 6, kv. 16, Moscow, U.S.S.R.

[21] Appl. No.: 939,339

[22] Filed: Sep. 5, 1978

[51] Int. Cl.² .......................................... H02M 7/515
[52] U.S. Cl. .................................... 363/124; 318/722; 318/811
[58] Field of Search ................... 318/722, 811, 345 R, 318/345 C; 363/124, 128

[56] References Cited

U.S. PATENT DOCUMENTS

| | | | |
|---|---|---|---|
| 3,777,237 | 12/1973 | Anderson | 318/345 |
| 4,093,980 | 6/1978 | Gurwicz | 363/124 X |

Primary Examiner—William M. Shoop
Attorney, Agent, or Firm—Lackenbach, Lilling & Siegel

[57] ABSTRACT

An apparatus for numerical control of a thyristor inverter comprises a decoder connected to a clock counter and a bidirectional counter, a control unit and a switching unit having seven AND gates, a NOT gate, a sign flip-flop, and a delay circuit. The clock counter is coupled to the first inputs of the first and second AND gates, the output of the first AND gate is coupled to the gate electrodes of the main and recharging thyristors of the thyristor inverter, and the outputs of the second and third gates are AND coupled to the gate electrode of the dropping thyristor. The first output of the decoder is coupled to the first inputs of the third and fourth AND gates, the output of an additional AND gate being coupled to the gate electrode of an additional thyristor and, via the delay circuit, to the gate electrode of the recharging thyristor. The control unit is coupled to the first inputs of the fifth, sixth and seventh AND gates. The second output of the decoder is coupled to the second input of the seventh AND gate and, via the NOT gate, to the second input of the sixth AND gate; and the second input of the fifth AND gate is coupled to the third output of the decoder. The outputs of the fifth, sixth and seventh and gates are coupled to the inputs of the sign flip-flop. The outputs of the sign flip-flop are respectively coupled to the second inputs of the second and fourth and first and third AND gates.

1 Claim, 13 Drawing Figures

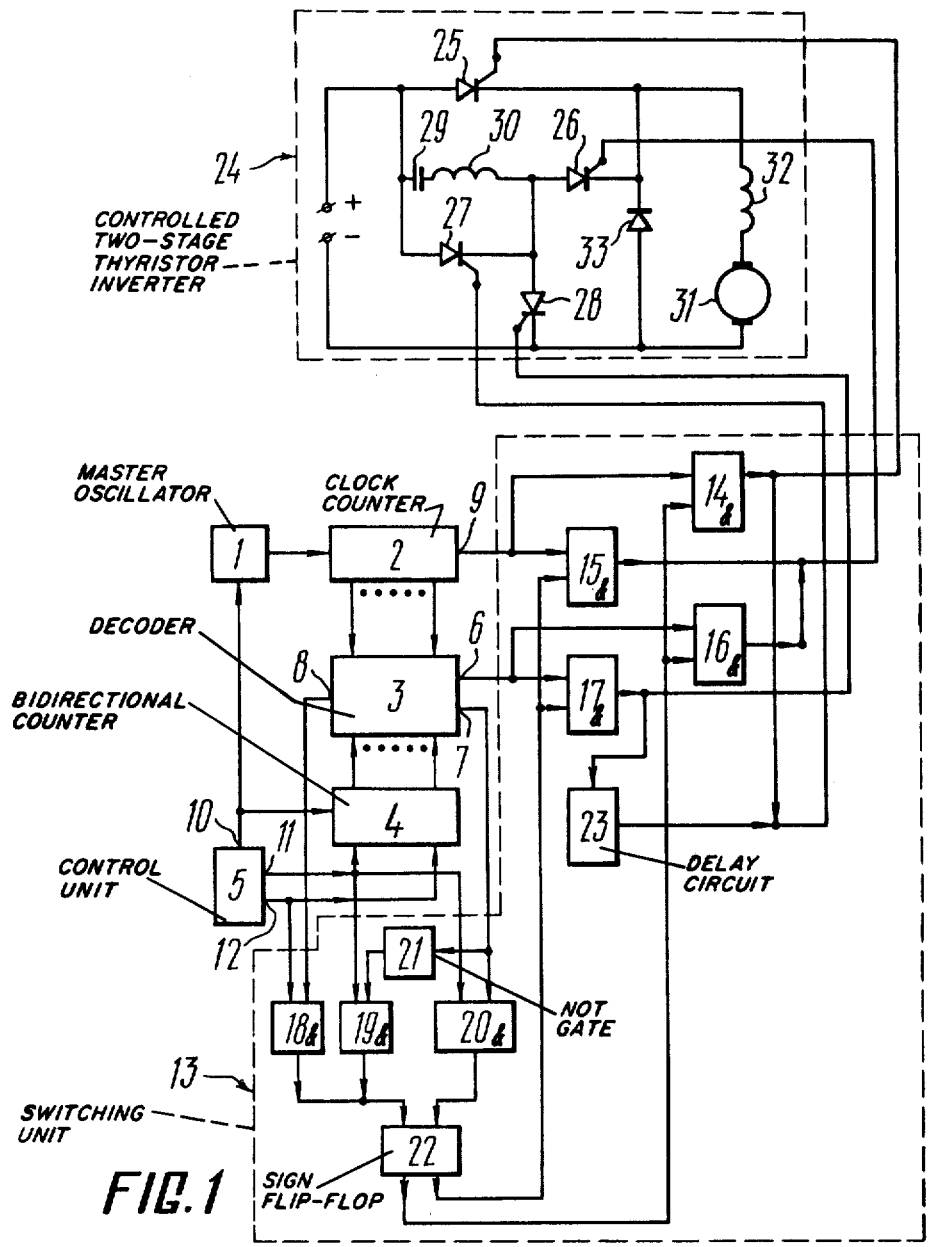

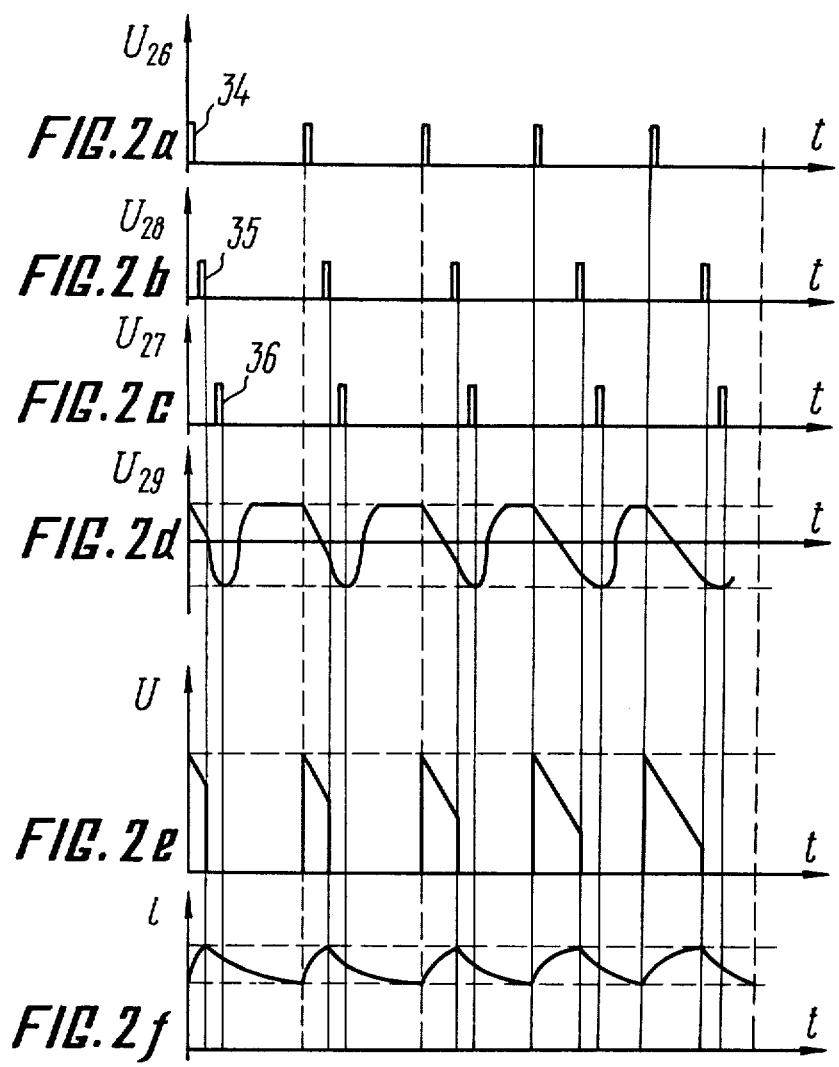

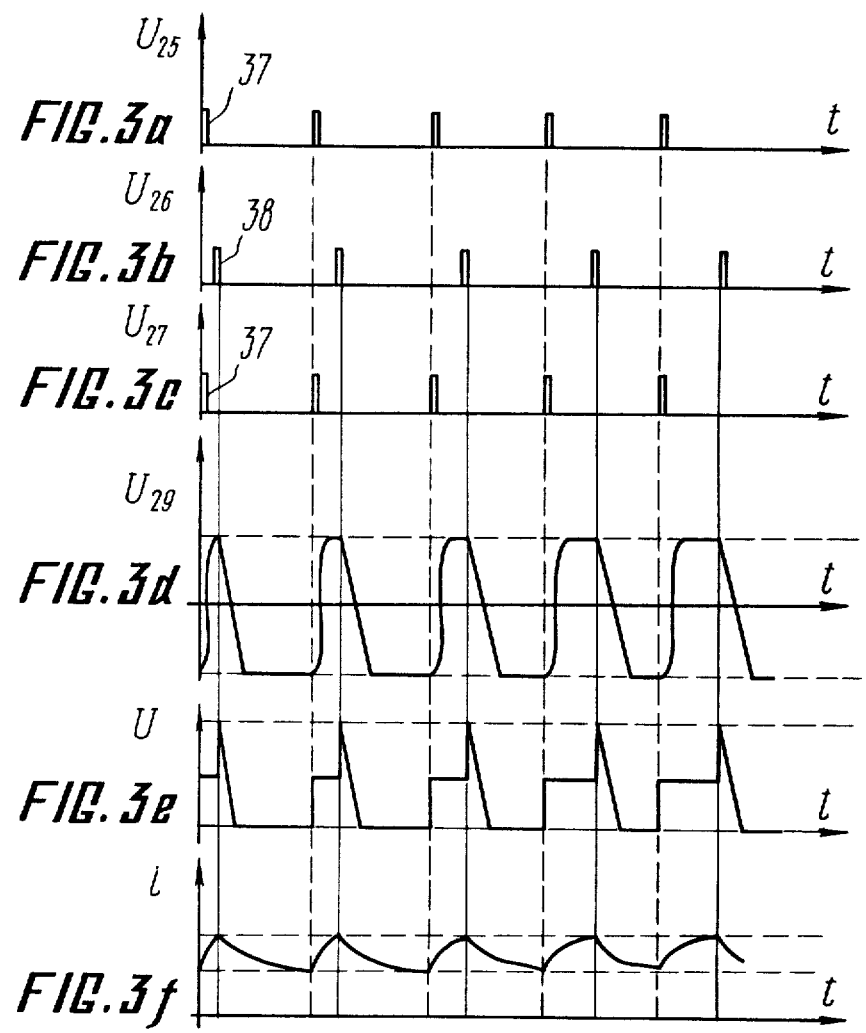

APPARATUS FOR NUMERICAL CONTROL OF THYRISTOR INVERTER

FIELD OF THE INVENTION

The invention relates to apparatus used for the control of static converters utilizing gas-discharge, vacuum and semiconductor devices with gate electrodes, and more particularly to an apparatus for numerical control of a thyristor inverter.

The invention is applicable for use in traction and industrial electric drive d.c. systems and provides a means for regulating the speed of rotation of electrical machines and for regulating the voltage across active-/inductive loads as well.

DESCRIPTION OF THE PRIOR ART

Known in the art is an apparatus for numerical control of a thyristor inverter (cf. the USSR Inventor's Certificate No. 394,907, Int. Cl. H02p, 13/16), which apparatus comprises a decoder having its inputs coupled to the outputs of a clock counter, whose input is connected to the output of a master oscillator, and to the outputs of a bidirectional counter having its add and subtract inputs coupled to respective outputs of a control unit. The control unit has its individual output coupled to the reset inputs of the bidirectional counter and the master oscillator; and the outputs of the decoder and the individual outputs of the clock counter are coupled to the gate electrodes of the thyristors of the inverter via a switching unit comprised of AND gates and a sign flip-flop. The decoder comprises two outputs coupled to the gate electrodes of two recharging thyristors. Two main thyristors of the converter and arranged to produce trains of pulses which are movable in time and shifted by 180° C., as compared to these outputs. The clock counter comprises two outputs coupled to the gate electrodes of two switching thyristors of the inverter and arranged to produce trains of pulses which are immovable in time and shifted by 180°, as compared to these outputs.

In the described apparatus, the trains of pulses from the outputs of the decoder are applied during the first regulation step to the gate electrodes of the two recharging thyristors via the switching unit and are applied during the second regulation step to the gate electrodes of the two main thyristors of the inverter.

In order to control a two-stage thyristor inverter utilizing the circuitry described, for example, in the USSR Inventor's Certificate No. 417,880, Int. Cl. H02m 3/14, three and two trains of pulses described above are necessary for the first and second regulation steps, respectively.

The described apparatus cannot provide for the control of a circuitry in which a different number of trains of pulses is to be applied to the gate electrodes of its thyristors in different regulation steps.

SUMMARY OF THE INVENTION

An object of the invention is to provide for the control of a two-stage thyristor inverter in which three and two trains of pulses for the first and second regulation steps, respectively, are to be applied to the gate electrodes of the thyristors of the inverter.

There is disclosed an apparatus for numerical control of a thyristor inverter, comprising a decoder having its inputs coupled to the outputs of a clock counter, whose input is coupled to the output of a master oscillator, and to the outputs of a bidirectional counter having its add and subtract inputs coupled to add and subtract outputs of a control unit. The control unit has an output coupled to the reset inputs of the bidirectional counter and the master oscillator. The outputs of the decoder and an output of the clock counter are coupled to the gate electrodes of the thyristors of the inverter via a switching unit. According the invention, the switching unit comprises seven AND gates, a NOT gate, a sign flip-flop, and a delay circuit. The output of the clock counter is coupled to the first inputs of the first and second AND gates, the output of the first AND gate is coupled to the gate electrodes of the main and recharging thyristors of the inverter, and the output of the second AND gate is coupled to the gate electrode of the dropping thyristor of the inverter, which is also connected to the output of the third AND gate. The control pulse output of the decoder is coupled to the first inputs of the third and fourth AND gates, and the output of the fourth AND gate is coupled to the gate electrode of the additional thyristor of the inverter and, via the delay circuit, to the gate electrode of the recharging thyristor of the inverter. The subtract output of the control unit is coupled to the first input of the fifth AND gate, the add output of the control unit is coupled to the first inputs of the sixth and seventh AND gates and the first regulation step switching pulse output of the decoder is coupled to the second input of the seventh AND gate and, via the NOT gate, to the second input of the sixth AND gate and the second input of the fifth AND gate is coupled to the second regulation step switching pulse output of the decoder. The outputs of the fifth and sixth AND gates are coupled to the first input of the sign flip-flop, and the output of the seventh AND gate is coupled to the second input of the sign flip-flop. The first individual output of the sign flip-flop is coupled to the second inputs of the second and fourth AND gates, and the second individual output of the sign flip-flop is coupled to the second inputs of the first and third AND gates.

The apparatus of the invention provides for numerical control of a two-stage thyristor inverter, which requires the application of three and two trains of pulses for the first and second regulation steps, respectively, to the gate electrodes of the thyristors of the inverter.

DESCRIPTION OF THE DRAWINGS

The invention will now be described, by way of example, with reference to the accompanying drawings in which:

FIG. 1 is a block diagram of an apparatus for numerical control of a thyristor inverter and a circuit diagram of the thyristor inverter, according to the invention;

FIGS. 2a–2f show timing diagrams of signals present at different points of the apparatus during the first regulation step, according to the invention;

FIGS. 3a–3f show timing diagrams of signals present at different points of the apparatus during the second regulation step, according to the invention.

DESCRIPTION OF THE INVENTION

The apparatus for numerical control of a thyristor inverter comprises according to the invention a master oscillator 1 (FIG. 1) implemented as a multivibrator and having its output coupled to the input of a clock counter 2 designed for high-speed carry of 1's and having the number of its outputs equal to twice the number of flip-flops incorporated therein.

The apparatus also comprises a decoder 3 having one group of its inputs coupled to the group of outputs of the clock counter 2, a bidirectional counter 4 having its outputs coupled to another group of the inputs of decoder 3, and a control unit 5 incorporating pulse generators and feedback elements.

The decoder 3 is made as a conventional decoding matrix. The decoder 3 has a control pulse output 6 to provide trains of control pulses movable in time. These trains of control pulses are time-shifted relative to one another by a quarter of the pulse period. Also, the decoder 3 has a first regulation step switching pulse output 7 and a second regulation step switching pulse output 8.

The clock counter 2 has a control pulse output 9.

A reset output 10 of the control unit 5 is coupled to reset inputs of the master oscillator 1 and the bidirectional counter 4. An add output 11 of the control unit 5 is coupled to the add input of the bidirectional counter 4, and a subtract output 12 of the control unit 5 is coupled to the subtract input of the bidirectional counter 4.

There is also provided a switching unit 13 having seven AND gates 14, 15, 16, 17, 18, 19 and 20, a NOT gate 21, a sign flip-flop 22, and a delay circuit 23.

A controlled two-stage thyristor inverter 24 comprises a main thyristor 25, a dropping thyristor 26, a recharging thyristor 27 and an additional thyristor 28. The inverter 24 also comprises a switching circuit incorporating a switching capacitor 29 and a switching choke 30 connected in series.

A load comprised of an armature 31 and a winding 32 connected in series and shunted by a diode 33 is connected in the circuit of the main thyristor 25.

The control pulse output 9 of the clock counter 2 is coupled to the first inputs of the first and second AND gates 14 and 15. The output of the first AND gate 14 is coupled to the gate electrodes of the main thyristor 25 and the recharging thyristor 27. The output of the second AND gate 15 and the output of the third AND gate 16 are coupled to the gate electrode of the dropping thyristor 26.

The control pulse output 6 of the decoder 3 is coupled to the first inputs of the third AND gate 16 and the fourth AND gate 17. The output of the fourth AND gate 17 is coupled to the gate electrode of the additional thyristor 28 and, via the delay circuit 23, to the gate electrode of the recharging thyristor 27.

The subtract output 12 of the control unit 5 is coupled to the first input of the fifth AND gate 18, and the add output 11 of the control unit 5 is coupled to the first inputs of the sixth AND gate 19 and the seventh AND gate 20.

The first regulation step switching pulse output 7 of the decoder 3 is coupled to the second input of the seventh AND gate 20 and, via the NOT gate 21, to the second input of the sixth AND gate 19. The second regulation step switching pulse output 8 of the decoder 3 is coupled to the second input of the fifth AND gate 18.

The outputs of the fifth and sixth AND gates 18 and 19 are coupled to the first input of the sign flip-flop 22, and the output of the seventh AND gate 20 is coupled to the second input of the sign flip-flop 22.

The first output of the sign flip-flop 22 is coupled to the second inputs of the second and fourth AND gates 15 and 17, and the second output of the sign flip-flop 22 is coupled to the second inputs of the first and third AND gates 14 and 16.

FIGS. 2a–2f illustrate the timing diagrams of the signals present at different points of the apparatus circuitry during the first regulation step as follows:

(a) voltage pulses 34 (FIG. 2a, voltage $U_{26}$) applied to the gate electrode of the dropping thyristor 26 (FIG. 1);

(b) voltage pulses 35 (FIG. 2b, voltage $U_{28}$) applied to the gate electrode of the additional thyristor 28 (FIG. 1);

(c) voltage pulses 36 (FIG. 2c, voltage $U_{27}$) applied to the gate electrode of the recharging thyristor 27 (FIG. 1);

(d) voltage $U_{29}$ (FIG. 2d) across the switching capacitor 29 (FIG. 1);

(e) voltage U (FIG. 2e) across the load;

(f) current i (FIG. 2f) through the load.

FIGS. 3a–3f illustrate the timing diagrams of the signals present at different points of the apparatus circuitry during the second regulation step as follows:

(a) voltage pulses 37 (FIG. 3a, voltage $U_{25}$) applied to the gate electrode of the main thyristor 25 (FIG. 1);

(b) voltage pulses 38 (FIG. 3b, voltage $U_{26}$) applied to the gate electrode of the dropping thyristor 26 (FIG. 1);

(c) voltage pulses 37 (FIG. 3c, voltage $U_{27}$) applied to the gate electrode of the recharging thyristor 27 (FIG. 1);

(d) voltage $U_{29}$ (FIG. 3d) across the switching capacitor 29 (FIG. 1);

(e) voltage U (FIG. 3e) across the load;

(f) current i (FIG. 3f) across the load.

The apparatus of the invention operates in the following manner.

The reset output 10 (FIG. 1) of the control unit 5 provides a potential to block the master oscillator 1 and to cause the flip-flops of the bidirectional counter 4 to change to the 0 state.

When a first pulse from the add output 11 of the control unit 5 arrives at the add input of the bidirectional counter 4, the flip-flops of the counter assume the 1 state.

At the moment the application of the first pulse occurs, a potential from the reset output 10 is obtained which makes the master oscillator 1 operative and the output of the oscillator provides clock pulses having a repetition frequency as follows:

$$f = f_0 \cdot 2^n,$$

where $f_0$ is the switching frequency of the thyristors 25, 26, 27, 28; and n is the number of the flip-flops in the clock counter 2 and in the bidirectional counter 4.

Under these conditions, a train of pulses with the repetition frequency $f_0$ is provided by the control pulse output 9 of the clock counter 2.

During the first regulation step, it is necessary to control the thyristors 26, 27 and 28 in which case the main thyristor 25 is made inoperative. A signal appears at the first regulation step switching pulse output 7 of the decoder 3 on completion of the first regulation step and is not present at the beginning of this step.

When no signal is present at the input of the NOT gate 21 the output of the NOT gate produces a signal coming to the second input of the sixth AND gate 19 and the other input of the sixth AND gate 19 accepts the pulses from the add output 11 of the control unit 5, which provides a condition in which a signal appears at the output of the sixth AND gate 19. This signal is applied to the first input of the sign flip-flop 22 and causes it to change to the state which enables the appearance of a signal at the first output of the sign flip-flop 22, which is then passed to the second inputs of the second and fourth AND gates 15 and 17.

When a pulse coming from the control pulse output 9 of the clock counter 2 coincides with a signal applied to the second input of the second AND gate 15, the output of the AND gate 15 produces the train of pulses 34 (FIG. 2a) with the repetition frequency $f_0$ to be applied to the gate electrode of the dropping thyristor 26.

The control pulse output 6 (FIG. 1) of the decoder 3 furnishes a train of control pulses which are shifted relative to the pulses available from the control pulse output 9 of the clock counter 2 by a time interval as follows:

$$\tau = T/2^n - 1,$$

where T is the switching period of the thyristors 25, 26, 27 and 28.

When a pulse obtainable from the output 6 of the decoder 3 arrives at the first input of the fourth AND gate 17 (the second input of the fourth AND gate 17 being provided with a signal from the first individual output of the sign flip-flop 22), the output of the fourth AND gate 17 produces pulses 35 (FIG. 2b) applied to the gate electrode of the additional thyristor 28 (FIG. 1).

At the same time, the pulses 35 are applied to the input of the delay circuit 23. Now, pulses 36 (FIG. 2c) coming to the gate electrode of the recharging thyristor 27 (FIG. 1) appear at the output of the delay circuit 23 after a time interval which is the sum of the time necessary for the recovery of the blocking properties of the additional thyristor 28 and the time during which the switching capacitor 29 is recharged to acquire a reverse polarity.

The appearance of the next pulse available from the add output 11 of the control unit 5 at the add input of the bidirectional counter 4 results in an increase in the time interval $\tau$. As a result, the arrival of each next pulse at the add input of the bidirectional counter 4 causes an increase in the time interval between the pulse 34 (FIG. 2a) applied to the gate electrode of the dropping thyristor 26 (FIG. 1) and the pulse 35 (FIG. 2b) applied to the gate electrode of the additional thyristor 28 (FIG. 1).

The time interval between the pulses 35 and 36 (FIGS. 2b, c) applied, respectively, to the gate electrodes of the additional and recharging thyristors 28 (FIG. 1) and 27 will be maintained constant during the entire first regulation step.

At the moment when the dropping thyristor 26 is driven to conduction, the voltage U (FIG. 2e) across the switching capacitor 29 (FIG. 1) and across the power supply is applied to the load through which the current i (FIG. 2f) begins to pass in this case.

Under these conditions, the recharging of the switching capacitor 29 (FIG. 1) occurs via the load circuit so that the switching capacitor 29 acquires a reverse polarity (FIG. 2d).

The appearance of the pulse 35 (FIG. 2b) at the gate electrode of the additional thyristor 28 (FIG. 1) results in the shunting of the load circuit and the switching capacitor 29 is further recharged via the additional thyristor 28; in this case, the current i (FIG. 2f) in the load continues to pass through the circuit of the diode 33 (FIG. 1) due to the effect of the electromagnetic energy that has been stored within the period of the pulse provided by the voltage U (FIG. 2e) applied to the load.

The appearance of the pulse 36 (FIG. 2c) at the gate electrode of the recharging thyristor 27 (FIG. 1) drives it to conduction and the switching capacitor 29 is recharged via the resonant circuit comprised of the switching capacitor 29 proper, the recharging thyristor 27 and the switching choke 30.

Increasing the time interval between the pulse 34 (FIG. 2a) applied to the gate electrode of the dropping thyristor 26 (FIG. 1) and the pulse 35 (FIG. 2b) applied to the gate electrode of the additional thyristor 28 (FIG. 1) results in an increase in the duration of the pulse provided by the voltage U (FIG. 2e) applied to the load, which, in turn, causes the armature 31 (FIG. 1) to rotate at a greater speed.

The maximum duration of the pulses obtainable from the voltage U (FIG. 2e) applied to the load during the first regulation step is equal to the time within which the switching capacitor 29 (FIG. 1) is recharged completely by the load current passing through the dropping thyristor 26.

After the first regulation step has been completed, the first regulation step switching pulse output 7 of the decoder 3 provides a signal causing the disappearance of the signal at the output of the NOT gate 21 and the appearance of a signal at the first input of the seventh AND gate 20.

When the next pulse from the add output 11 of the control unit 5 appears at the second input of the seventh AND gate 20, the output of the AND gate 20 provides a signal applied to the second input of the sign flip-flop 22 which changes to the other state which causes a signal to appear at the second output of the sign flip-flop 22 and at the second inputs of the first and third AND gates 14 and 16.

When the pulse from the control pulse output 9 of the clock pulse 2 and the signal applied to the second input of the first AND gate 14 are in coincidence, the train of pulses 37 (FIG. 3a) with the repetition frequency $f_0$, available from the output of the first AND gate 14, comes to the gate electrode of the main thyristor 25. At the same time, the pulses 37 (FIG. 3c) are delivered to the gate electrode of the recharging thyristor 27 (FIG. 1).

The control pulse output 6 of the decoder 3 provides a train of control pulses which are shifted relative to the pulses obtainable from the control pulse output 9 of the clock counter 2 and are applied to the first input of the third AND gate 16. This train of the pulses 38 (FIG. 3b) is then applied to the gate electrode of the dropping thyristor 26 (FIG. 1).

Each pulse applied to the add input of the bidirectional counter 4 results in an increase in the time interval between the pulse 37 (FIGS. 3a, c) applied, respectively, to the gate electrodes of the main and recharging thyristors 25 (FIG. 1) and 27 and the pulse 38 (FIG. 3b) applied to the gate electrode of the dropping thyristor 26 (FIG. 1). To decrease this time interval, the pulses from the subtract output 12 of the control unit 5 are applied to the subtract input of the bidirectional counter 4.

The application of the pulse 37 (FIG. 3a) to the gate electrode of the main thyristor 25 (FIG. 1) drives it to conduction and the voltage U (FIG. 3e) from the power supply is applied to the load. At the same time, the recharging thyristor 27 (FIG. 1) is rendered conducting to provide a path through which the switching capacitor 29 is recharged to acquire a reverse polarity (FIG. 3d).

The current i (FIG. 3f) in the load tends to increase from the rated minimum value to the rated maximum value at which the pulse 38 (FIG. 3b) is applied to the gate electrode of the dropping thyristor 26 (FIG. 1).

With the dropping thyristor 26 driven to conduction, the voltage $U_{29}$ (FIG. 3d) across the switching capacitor 29 (FIG. 1) is applied to the main thyristor 25, thereby driving it to cut-off.

The current i (FIG. 3f) continues to pass in the load circuit via the diode 33 (FIG. 1) during the space interval.

Increasing the time interval between the pulses 37 (FIGS. 3a, c) applied, respectively, to the gate electrodes of the main and recharging thyristors 25 and 27 (FIG. 1) and the pulse 38 (FIG. 3b) applied to the gate electrode of the dropping thyristor 26 (FIG. 1) causes an increase in the duration of the pulse provided by the voltage U (FIG. 3e) applied to the load, which, in turn, provides for a further increase in the speed of rotation of the armature 31 (FIG. 1).

To decrease the speed of rotation of the armature 31, the above time interval is decreased.

After the second regulation step has been finished, the second regulation step switching pulse output 8 of the decoder 3 provides a signal applied to the first input of the AND gate 18 whose second input receives the pulses from the subtract output 12 of the control unit 5.

The next pulse from the subtract output 12 of the control unit 5 comes to the output of the fifth AND gate 18 and causes the sign flip-flop 22 to change to the other state with the result that a signal appears at the first output of the sign flip-flop 22 and then passes to the second inputs of the second and fourth AND gates 15 and 17.

After that, the apparatus operates to perform the first regulation step in which the main thyristor 25 is made inoperative. In this case, the regulation process is similar to that described above with the exception that the time interval between the pulse 34 (FIG. 2a) applied to the gate electrode of the dropping thyristor 26 (FIG. 1) and the pulse 35 (FIG. 2b) applied to the gate electrode of the additional thyristor 28 (FIG. 1) is decreased each time the next pulse arrives at the subtract input of the bidirectional counter 4.

The apparatus of the invention therefore makes it possible to control the two-stage thyristor inverter 24 in which three trains of pulses are applied to the gate electrodes of the thyristors 26, 27 and 28 during the first regulation step and two trains of pulses are applied to the gate electrodes of the thyristors 25, 26 and 27 during the second regulation step.

What is claimed is:

1. An apparatus for numerical control of a thyristor inverter incorporating main, dropping, recharging and additional thyristors, comprising:

a master oscillator having an input and an output;

a clock counter having an input connected to the output of said master oscillator, a control pulse output and a group of outputs;

a bidirectional counter having a reset input, an add input, a subtract input and a group of outputs;

a decoder having groups of inputs respectively coupled to said groups of outputs of said bidirectional counter and of said clock counter, a control pulse output, a first regulation step switching pulse output, and a second regulation step switching pulse output;

a control unit having a reset output coupled to said reset input of said bidirectional counter and to the input of said master oscillator, an add output coupled to said add input of said bidirectional counter, and a subtract output coupled to said substract input of said bidirectional counter; and a switching unit comprising first, second, third, fourth, fifth, sixth and seventh AND gates, a NOT gate, a sign flip-flop, and a delay circuit; wherein said first AND gate of said switching unit has a first input coupled to said control pulse output of said clock counter, a second input, and an output coupled to gate electrodes of said main and recharging thyristors of said thyristor inverter;

said second AND gate of said switching unit has a first input coupled to said control pulse output of said clock counter, a second input, and an output coupled to a gate electrode of said dropping thyristor;

said third AND gate of said switching unit has a first input coupled to said control pulse output of said decoder, a second input, and an output coupled to the gate electrode of said dropping thyristor;

said fourth AND gate of said switching unit has a first input coupled to said control pulse output of said decoder, a second output, and an output coupled to a gate electrode of said additional thyristor;

said fifth AND gate of said switching unit has a first input coupled to said subtract output of said control unit, a second input coupled to said second regulation step switching pulse output of said decoder, and an output;

said sixth AND gate of said switching unit has a first input coupled to said add output of said control unit, a second input, and an output;

said seventh AND gate of said switching unit has a first input coupled to said add output of said control unit, a second input coupled to said first regulation step switching pulse output of said decoder, and an output;

said NOT gate of said switching unit has an input coupled to said first regulation switching pulse output of said decoder, and an output coupled to the second input of said sixth AND gate;

said sign flip-flop of said switching unit has a first input coupled to the outputs of said fifth and sixth AND gates, a second input coupled to the output of said seventh AND gate, a first output coupled to the second inputs of said second and fourth AND gates, and a second output coupled to the second inputs of said first and third AND gates; and said delay circuit of said switching unit has an input coupled to the output of said fourth AND gate, and an output coupled to the gate electrode of said recharging thyristor.

* * * * *